United States Patent
Eriksson et al.

(10) Patent No.: US 11,809,612 B2
(45) Date of Patent: Nov. 7, 2023

(54) METHOD AND INTRUSION MANAGER FOR HANDLING INTRUSION OF ELECTRONIC EQUIPMENT

(71) Applicant: Telefonaktiebolaget LM Ericsson (publ), Stockholm (SE)

(72) Inventors: Marcus Eriksson, Järfälla (SE); Fredrik Nilsson, Täby (SE); Carl Jansson, Tullinge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 369 days.

(21) Appl. No.: 17/052,410

(22) PCT Filed: May 30, 2018

(86) PCT No.: PCT/SE2018/050546
§ 371 (c)(1),
(2) Date: Nov. 2, 2020

(87) PCT Pub. No.: WO2019/231365
PCT Pub. Date: Dec. 5, 2019

(65) Prior Publication Data
US 2021/0073426 A1    Mar. 11, 2021

(51) Int. Cl.
*G06F 21/86* (2013.01)
*G06F 21/55* (2013.01)

(52) U.S. Cl.
CPC ............ *G06F 21/86* (2013.01); *G06F 21/554* (2013.01)

(58) Field of Classification Search
CPC .......... G06F 21/70; G06F 21/71; G06F 21/72; G06F 21/73; G06F 21/74; G06F 21/75;
(Continued)

(56) References Cited

U.S. PATENT DOCUMENTS 6,052,764 A *  4/2000  Mogul ............... G06F 11/1469
                                                    714/E11.122
7,073,055 B1 *  7/2006  Freed ................... H04L 63/0823
                                                    726/4
(Continued)

FOREIGN PATENT DOCUMENTS

EP          1 887 754 A1    2/2008
GB          2557246 A  *    6/2018  ........... G08B 29/145

OTHER PUBLICATIONS

Heberlein, Todd. "Tactical operations and strategic intelligence: Sensor purpose and placement." Net Squared Inc, Tech. Rep. TR-2002-04.02 (2002). Obtained online from <https://markowsky.us/papers/net-papers/heberlein_tactical_operations_and_strategic_intelligence.pdf> (Year: 2002).*

(Continued)

*Primary Examiner* — Farid Homayounmehr
*Assistant Examiner* — Zhimei Zhu
(74) *Attorney, Agent, or Firm* — BAKER BOTTS L.L.P.

(57) ABSTRACT

A method and intrusion manager (200) for handling intrusion to an electronic equipment (202). When a sensor (204) detects (2:2) an intrusion to the electronic equipment, an intrusion entry indicating the detected intrusion is stored (2:3), and an associated sign-off message which identifies the stored intrusion entry is also stored (2:5). The sign-off message comprises a signature that validates the detected intrusion, which signature may be received (2:4) as input from an authorised person. Thereby, any stored intrusion entry can be checked by searching for an associated sign-off message, and a stored intrusion entry having no matching sign-off message with a valid signature can be determined to be unauthorised.

25 Claims, 4 Drawing Sheets intrusion entries:

1. open lid, ID a
2. close lid, ID b
3. open lid, ID c
4. close lid, ID d
⋮

ID a matches ID A
ID b matches ID B
ID c matches ID C
ID d matches ID D sign-off messages:

1. ID A, sign 1
2. ID B, sign 2
3. ID C, sign 3
4. ID D, sign 4
⋮

(58) Field of Classification Search
CPC .......... G06F 21/76; G06F 21/86; G06F 21/85; G06F 21/55; G06F 21/554
See application file for complete search history.

(56) References Cited

U.S. PATENT DOCUMENTS

| | | | | |
|---|---|---|---|---|
| 2002/0108082 | A1* | 8/2002 | McDonnell | H04L 1/1809 714/748 |
| 2002/0111133 | A1* | 8/2002 | Wittkotter | G06F 21/6218 455/1 |
| 2007/0179986 | A1 | 8/2007 | Adam | |
| 2007/0271596 | A1* | 11/2007 | Boubion | G06F 21/77 726/3 |
| 2010/0304715 | A1* | 12/2010 | Schroeder | G08B 25/002 455/411 |
| 2013/0265163 | A1* | 10/2013 | Joyce | G06F 21/86 340/551 |
| 2015/0058979 | A1* | 2/2015 | Peeters | G06F 21/575 726/22 |
| 2016/0217283 | A1 | 7/2016 | Liu et al. | |
| 2020/0250349 | A1* | 8/2020 | Fersel | H04W 12/0431 |

OTHER PUBLICATIONS

PCT Internatinoal Search Report issued for International application No. PCT/SE2018/050546—dated Dec. 17, 2018.
PCT Written Opinion of the International Searching Authority issued for International application No. PCT/SE2018/050546—dated Dec. 17, 2018.

* cited by examiner

METHOD AND INTRUSION MANAGER FOR HANDLING INTRUSION OF ELECTRONIC EQUIPMENT

PRIORITY

This nonprovisional application is a U.S. National Stage Filing under 35 U.S.C. § 371 of International Patent Application Serial No. PCT/SE2018/050546 filed May 30, 2018 and entitled "METHOD AND INTRUSION MANAGER FOR HANDLING INTRUSION OF ELECTRONIC EQUIPMENT" which is hereby incorporated by reference in its entirety.

TECHNICAL FIELD

The present disclosure relates generally to a method and an intrusion manager, for handling intrusion of an electronic equipment.

BACKGROUND

When selling electronic equipment with some kind of warranty, it is generally of interest to know whether any unauthorised person has opened and manipulated the electronic equipment at some point, e.g. in case the equipment has become faulty or does not operate as expected. For example, a customer having purchased or hired the electronic equipment may come back to a seller or vendor of the equipment and complain that it has some fault or malfunction, e.g. reduced performance or even operation failure.

If the equipment has been sold or otherwise delivered with a warranty which guarantees repair at no or reduced fee, it may be a condition in the warranty that no intrusion has been made to the equipment by any unauthorised person. To ensure this, a seal or the like may be applied on a lid or cover of the electronic equipment as a protection so that a broken seal indicates intrusion and potential unauthorised manipulation of the equipment. In that case, the vendor or other supplier takes no responsibility for the equipment since only authorised personnel is typically allowed to open and manipulate the equipment. The warranty is thus typically not valid if the seal is broken.

In this disclosure, the term "electronic equipment" may refer to a consumer product such as a communication device, computer, Hi-Fi component or TV set, or it may also refer to a system product e.g. in a communication network such as a radio base station or other node in the network. It should be noted that these examples are only illustrative without limitation to the following description which is valid for any electronic equipment and authorised or unauthorised intrusion thereof.

Figure 1:
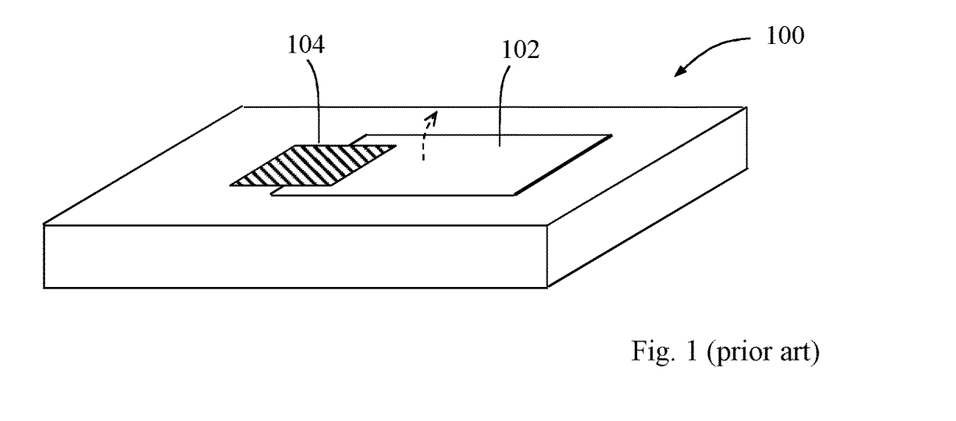
FIG. 1 is a schematic example of how an electronic equipment can be protected by a seal, according to the prior art.

FIG. 1 illustrates schematically an electronic equipment 100 comprising a lid 102 that can be opened for accessing various parts therein such as electronic circuitry and hardware components. A seal or sticker 104 has been applied to the lid and will provide an indication of intrusion if the seal or sticker is found to be broken, e.g. when the customer brings the equipment 100 back to a vendor or other supplier and claims a warranty or the like.

However, there are several drawbacks of relying on such a seal. First, it is often quite easy for an unauthorised intruder to carefully remove the seal and apply it again after intrusion without causing any visible damage to the seal, so that the intrusion will go unnoticed. Second, an intruder may be able to replace a broken seal with a new one. Third, if the seal is found to be broken, there is no way of establishing when, or indeed how many times, intrusion has taken place and by whom. In either case, it may be impossible to trace any number of intrusion(s) to the electronic equipment which would otherwise be helpful when investigating or evaluating the equipment in terms of functionality, performance and/or malfunction.

SUMMARY

It is an object of embodiments described herein to address at least some of the problems and issues outlined above. It is possible to achieve this object and others by using a method and an intrusion manager as defined in the attached independent claims.

According to one aspect, a method is provided for handling intrusion to an electronic equipment, which may be performed by an intrusion manager. In this method, when an intrusion to the electronic equipment is detected an intrusion entry indicating the detected intrusion is stored, e.g. in a suitable memory. An associated sign-off message which identifies the stored intrusion entry is also stored, the sign-off message comprising a signature that validates the detected intrusion.

Thereby, it is an advantage that any stored intrusion entry in the memory can be checked by searching for an associated stored sign-off message, and a stored intrusion entry having no matching sign-off message with a valid signature can be identified as unauthorised. Another advantage is that any previously made authorised and unauthorised intrusions logged as intrusion entries can be traced so that a history of intrusions can be investigated for troubleshooting or other evaluation of the electronic equipment.

According to another aspect, an intrusion manager is arranged to handle intrusion to an electronic equipment. The intrusion manager is configured to detect an intrusion to the electronic equipment, and to store an intrusion entry indicating the detected intrusion. The intrusion manager is further configured to store an associated sign-off message which identifies the stored intrusion entry, the sign-off message comprising a signature that validates the detected intrusion.

The above method and intrusion manager may be configured and implemented according to different optional embodiments to accomplish further features and benefits, to be described below.

A computer program is also provided comprising instructions which, when executed on at least one computer in the above intrusion manager, cause the at least one computer to carry out the method described above. A carrier is also provided which contains the above computer program, wherein the carrier is one of an electronic signal, an optical signal, a radio signal, or a computer readable storage medium.

BRIEF DESCRIPTION OF DRAWINGS

The solution will now be described in more detail by means of exemplary embodiments and with reference to the accompanying drawings, in which.

DETAILED DESCRIPTION

Briefly described, a solution is provided to enable investigation of intrusions to an electronic equipment, basically in terms of validity and occurrence, which is accomplished by employing a method and/or an intrusion manager arranged for handling intrusion to the electronic equipment. When a sensor or the like detects that an intrusion is made to the electronic equipment, an intrusion entry indicating the detected intrusion is stored in a memory, e.g. a memory in which a written entry cannot be modified or erased to avoid any tampering with the intrusion entry, so that the intrusion can be traced in a reliable manner. Such a memory may be referred to as a "one-time programmable" memory. If the intrusion is made by an authorised person, an associated sign-off message which identifies the stored intrusion entry is also stored, e.g. in another memory. The intrusion entry and its associated sign-off message are stored locally in different memory spaces of a suitable data storage arranged in the electronic equipment, herein referred to as a first memory and a second memory, respectively.

To prove that the intrusion is authorised, the sign-off message comprises a signature or the like that validates the detected intrusion, which signature may be received as input from the authorised person at the time of intrusion. The signature may be a digital signature that has been verified by a trusted party such as a known and trustworthy certificate authority that issues certificates for digital signatures. Thereby, it is an advantage that any stored intrusion entry in the data storage such as the first memory, can be checked by searching for an associated sign-off message in the data storage such as the second memory, and a stored intrusion entry having no matching sign-off message with a valid signature can be determined to be unauthorised.

An example of how the solution may be employed in a procedure performed by an intrusion manager will now be described with reference to FIG. 2 where the intrusion manager 200 is shown as implemented within an electronic equipment 202 in a suitable manner. It may also be possible to implement the intrusion manager 200 as a separate entity that can be attached to or integrated with the intrusion manager 200 in any other manner, and the embodiments, features and details described herein are not limited in this respect. How to arrange the intrusion manager 200 in or at the electronic equipment 202 is thus up to practical implementation depending on how the electronic equipment 202 is designed.

The electronic equipment 202 may, without limitation, be a consumer product such as a communication device, computer, Hi-Fi component or TV set, or it may be a node or component of a system with several nodes/components such as a communication network. It can basically be assumed that it is of interest to check and/or analyze any intrusions made to the electronic equipment 202, for whatever reason. The electronic equipment 202 is schematically illustrated with a lid or closure 202A that can be opened and closed to enable access to an interior space where electronic circuitry and various hardware components may reside, as similar to the lid 102 of FIG. 1. The intrusion manager 200 in this example is shown to comprise a control unit 206 which may contribute to the procedure as follows.

A first operation 2:1 illustrates that the lid or closure 202A is opened or closed which is registered by a sensor 204 arranged in the electronic equipment 202. The sensor 204 is thus capable of detecting manipulation of the lid or closure 202A and may be a microswitch, a magnetic field sensor, a light sensor, or a motion sensor, to mention a few non-limiting examples. The sensor 204 could be seen as a part of the intrusion manager 200 or not and may further be capable of sensing that a housing or cover of the equipment 202 is broken. In a next operation 2:2, the control unit 206 receives a signal from the sensor 204 which indicates that an intrusion to the electronic equipment 202 has been registered, in this case by sensing that the lid or closure 202A has been opened or closed. Some other useful ways of detecting intrusion will be described later below. The intrusion manager 200 thus essentially detects an intrusion to the electronic equipment 202 in operation 2:2.

As a result of the detected intrusion, the control unit 206 stores information that corresponds to and indicates the detected intrusion, in an operation 2:3, which information is specified or defined as an "intrusion entry" which is stored in a first memory space 208, called "first memory" for short herein. The first memory may be a memory where a written entry cannot be modified or erased, to avoid any tampering with the intrusion entry. The intrusion entry thus includes a registration that the intrusion has occurred and may contain information such as a detected movement of the lid 202A to indicate opened or closed, and a timestamp or the like that indicates the time when the intrusion was detected. Any further manipulation within the electronic equipment 202 that has occurred in connection with the detected intrusion is outside the procedure described herein. In this procedure it is thus not necessary that the intrusion manager 200 detects and registers exactly what is done to the electronic equipment 202 after the intrusion.

The time of detection may be indicated in terms of a reference time or clock, or by an amount of time since a preset "zero" time which may have been set when the electronic equipment 202 was manufactured or put into use. Further, the zero time may be reset at any time, e.g. when the electronic equipment 202 is upgraded or when its owner is changed. The intrusion entry may also contain an identification of the detected intrusion such as a unique sequence number or combination of characters that can be represented by a limited number of bits. Any combination of the above examples of information may be contained in the intrusion entry and the solution is not limited in this respect.

In this example, the intrusion is made by an authorised person who also enters a signature that validates the detected intrusion to an input unit 210 of the intrusion manager 200 and the entered signature is received by the control unit 206 in another operation 2:4. The control unit 206 then stores the received signature together with an identification and/or timestamp in a "sign-off message" that is associated with the detected intrusion, in an operation 2:5. This sign-off message is stored in a second memory space 212, called "second memory" for short herein.

The sign-off message can thus be seen as an attempt to authenticate the intrusion and thereby also the stored intrusion entry, provided that the signature in the sign-off message is valid. The intrusion entry stored in operation 2:3 and the sign-off message stored in operation 2:5 may be mutually associated by having matching timestamps and/or identifications. For example, their timestamps may be considered to match if the duration between them is within a predefined limit. Further, their identifications may be considered to match if they fulfill a predefined relation, e.g. by being equal.

A further optional operation 2:6 illustrates that the control unit 206 may check validity of the signature by querying an authorisation center 214 or the like which is regarded as a trusted party that may have issued and assigned the signature for exclusive use by one or more authorised persons. This operation may be performed immediately after detecting the intrusion so that the stored intrusion entry and/or sign-off message can be marked as valid in the first and second memories, respectively. Alternatively, operation 2:6 may be performed at some point later, e.g. when checking whether the electronic equipment 202 has been subjected to any unauthorised intrusion(s), or when retrieving a history of stored intrusion entries to perform troubleshooting or evaluation of the electronic equipment 202.

An unauthorised intrusion may be discovered in two basic situations. First, the intrusion detected in operation 2:2 may not be followed by an entered signature as of operation 2:4. In that case, the intrusion entry stored in the first memory 208 as of operation 2:3 will not have any matching sign-off message stored in the second memory 212, which can be discovered by comparing intrusion entries in memory 208 with sign-off messages in memory 212. As indicated above, an intrusion entry in memory 208 must be matched with a sign-off message comprising a valid signature in memory 212, e.g. if these entries have matching timestamps and/or identifications, to prove that the detected intrusion was authorised.

Second, the intrusion detected in operation 2:2 may be followed by a signature entered in operation 2:4 that is however not valid, which implies that the intruder has entered a "fake" signature in operation 2:4. This may be revealed in operation 2:6 when the authorisation center 214 cannot confirm validity of the signature.

In either case, when discovering an unauthorised intrusion either by missing a matching sign-off message altogether or finding an invalid signature in a matching sign-off message, the intrusion manager may send a notification to a supervision center or the like, in another optional operation 2:7, to indicate the unauthorised intrusion. Alternatively or additionally, the intrusion entry may be marked as unauthorised in memory 208, e.g. for future troubleshooting or evaluation of the electronic equipment 202.

Hence, operations 2:1-2:5 can be seen as a registration procedure for logging information about detected intrusions, while operations 2:6-2:7 can be seen as an examination procedure for retrieving, analyzing or evaluating any intrusions made to the electronic equipment 202. The latter operations may be performed when a user of the electronic equipment 202 claims a warranty or the like to a vendor or other supplier of the equipment. It is thus an advantage that any authorised and unauthorised intrusions can be reliably traced in the manner described herein, and that a history of intrusions can thereby be analyzed and evaluated, e.g. for troubleshooting or similar.

Another example of how the solution may be employed in terms of actions performed by an intrusion manager such as the intrusion manager 200, is illustrated by the flow chart in FIG. 3, which will now be described with further reference to entities in FIG. 2, although without limitation to the specific example scenario illustrated in FIG. 2. The actions in FIG. 3 can thus be performed by the intrusion manager 200 for handling intrusion to an electronic equipment 202.

A first action 300 illustrates that the intrusion manager 200 detects an intrusion to the electronic equipment 202, which corresponds to the above-described action 2:2. In a next action 302, the intrusion manager 200 stores an intrusion entry indicating the detected intrusion, which corresponds to the above-described action 2:3. In a next optional action 304, the intrusion manager 200 may receive a digital signature as an input made by a person in connection with the detected intrusion, which corresponds to the above-described action 2:4.

In a next action 306, the intrusion manager 200 also stores an associated sign-off message which identifies the stored intrusion entry, the sign-off message comprising a signature that validates the detected intrusion. This action corresponds to the above-described action 2:5. Thereby, an authorised intrusion has been registered by the intrusion manager 200 and it can be traced at some point later, e.g. when analysing or evaluating intrusions that have been made to the electronic equipment 202. As explained above, if a signature that can be validated has been received in connection with the detected intrusion, the stored sign-off message comprising the signature will confirm that the stored intrusion entry refers to an authorised intrusion.

Some further examples of embodiments that may be employed in the above procedure in FIG. 4 will now be described. In one example embodiment, the signature may be a digital signature received as input from an authorised person, e.g. by manual input. The digital signature may have been assigned by a trusted party for exclusive use by one or more authorised persons. In another example embodiment, the signature may be a digital signature that has been verified by a trusted party. The intrusion manager 200 may in this case be able to verify the validity of the received signature by querying the trusted party which may be an authorisation center or the like, as in the above-described operation 2:6.

In another example embodiment, the intrusion may be detected when a lid or cover 202A on the electronic equipment is opened or closed. An intrusion may also be detected when the electronic equipment 202 is in any way opened for enabling access to its interior components which may be accomplished by detaching or braking a cover or housing, depending on how the equipment 202 is designed.

In another example embodiment, any stored intrusion entry having no matching sign-off message with a valid signature is determined to be unauthorised. It was described above for operation 2:6 that the intrusion manager 200 may investigate an intrusion entry in memory 208 by searching for a matching sign-off message comprising a valid signature in memory 212. If no such sign-off message is found, the intrusion entry and its indicated intrusion is thus unauthorised. In this case, another example embodiment may be that a notification is sent to a supervision center 216 to indicate the unauthorised intrusion.

It was mentioned above that the intrusion entry and its associated sign-off message can be stored in different memory spaces arranged in the electronic equipment. In another example embodiment, one or more intrusion entries may thus be stored in a memory where a written entry cannot be modified, such as the above-mentioned first memory 208, and one or more associated sign-off messages may be stored in a persistent memory, such as the above-mentioned second memory 212. In another example embodiment, the first memory 208 and the second memory 212 are located in the electronic equipment.

In another example embodiment, both the intrusion entry and the sign-off message comprise an identification and/or timestamp to enable validation of the detected intrusion by matching of said intrusion entry with the associated sign-off message. In more detail, the timestamp in the sign-off message may be somewhat later than the timestamp in the intrusion entry and it might be possible to find that the sign-off message is associated with the intrusion entry by comparing their timestamps, and it may even be required that they are not separated in time by more than a predefined limit, although the embodiment is not limited in this respect. When the sign-off message and the intrusion entry comprise an identification instead of timestamp, it should be possible to find the above association by comparing the identifications which may be identical or otherwise related in a predefined manner. In another example embodiment, validity of any detected intrusion may be determined by checking whether an entry for the intrusion has an identification and/or timestamp that matches an identification and/or timestamp of a sign-off message which comprises a valid signature.

It was described above that a sensor 204 may be used for detection of intrusions. In further example embodiments, an intrusion may be detected by at least one of the following illustrative but non-limiting alternatives:

A) A microswitch which may be coupled to the lid or cover 202A so that any movement of the lid or cover 202A triggers the microswitch to generate a signal to indicate the intrusion, as in operation 2:2.

B) A magnetic field sensor which could be configured to detect movement of the lid or cover 202A or other part by sensing a change of a magnetic field that usually occurs when a metal object is moved.

C) A light sensor which could be configured to detect a change in light in the electronic equipment 202 which would occur if it is somehow opened and subsequently closed.

D) A motion sensor which could be configured to detect motion or movement of any part or component in the electronic equipment 202.

In another example embodiment, a history of stored intrusion entries may be used for troubleshooting or evaluation of the electronic equipment. For example, if a number of intrusions to the electronic equipment 202 have been registered it may be of interest to get knowledge about whether any unauthorised intrusion(s) has been made, and/or how many times and at what times the intrusions have occurred. The stored intrusion entries can then be investigated and evaluated by counting them and checking their timestamps, if used. It can also be checked whether the stored intrusion entries have matching sign-off messages with valid signature(s), e.g. using the procedure of FIG. 4 to be described below. It should be noted that two or more intrusions may be followed by input of one and the same signature or two or more related signatures, e.g. in case the intrusions were made by the same person.

Figure 3:
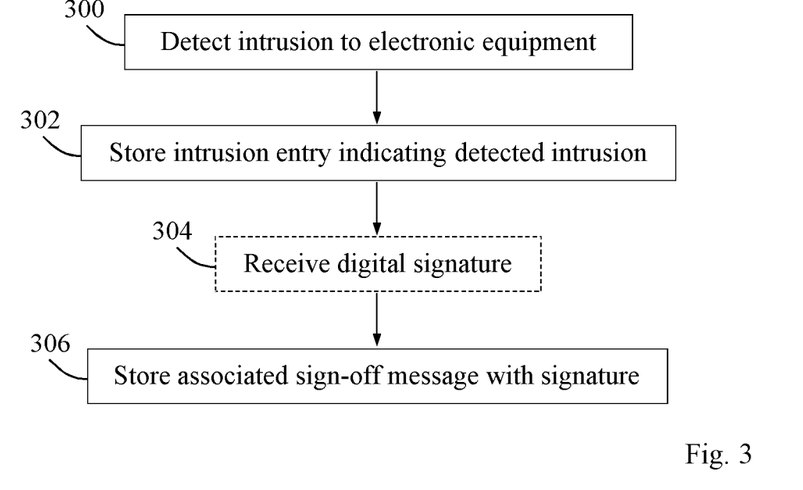
FIG. 3 is a flow chart illustrating a procedure in an intrusion manager, according to further example embodiments.
Figure 4:
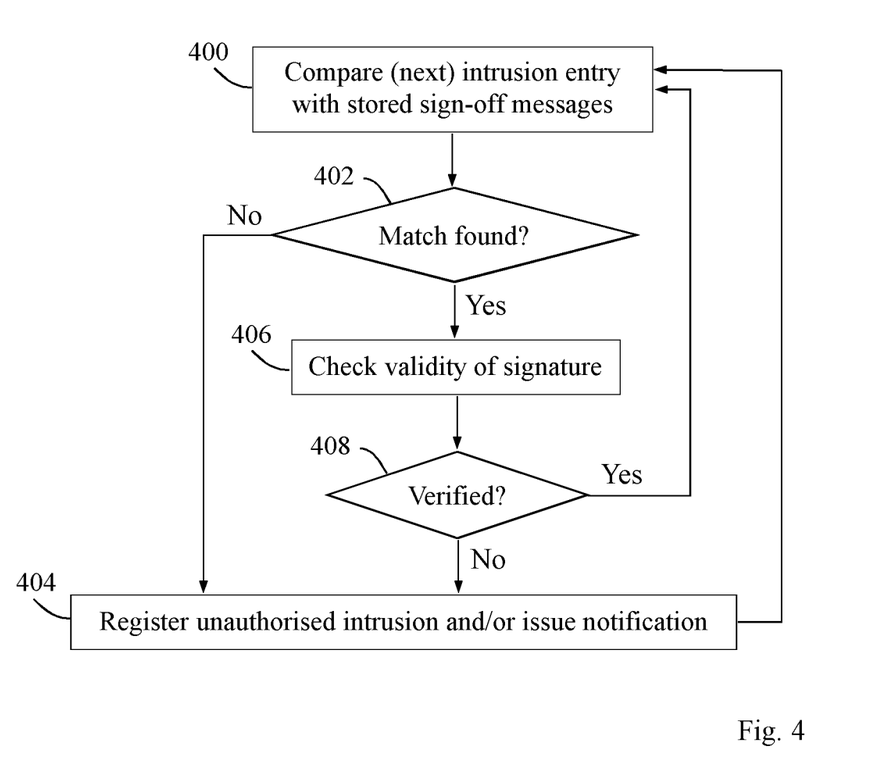
FIG. 4 is a flow chart illustrating how an intrusion manager may operate to check detected intrusions, according to further example embodiments.

A further example of operations in the intrusion manager 200 to accomplish the above check of validity of registered intrusions to an electronic equipment 202, is illustrated in FIG. 4, which could be employed in conjunction with the operations shown in FIG. 3 as follows. The terminology used when describing FIG. 3 will also be used below when describing FIG. 4. This procedure may thus be employed to enable troubleshooting or evaluation of the electronic equipment based on a history of stored intrusion entries.

A first action 400 illustrates that the intrusion manager 200 checks an intrusion entry in the first memory 208 by comparing it with any stored sign-off messages in the second memory 212. If no sign-off message that matches the intrusion entry is found in an action 402, the intrusion is registered as unauthorised, e.g. by marking the investigated intrusion entry as unauthorised in the first memory 208, and/or a notification of the unauthorised intrusion is issued, as illustrated by an action 404. The procedure may then return to action 400 for checking a next intrusion entry in the first memory 208.

On the other hand, if a sign-off message that matches the intrusion entry is found in action 402, the intrusion manager 200 further checks whether the sign-off message comprises a valid signature or not, in another action 406. If it is found in an action 408 that the signature in the sign-off message can be verified, no specific action needs to be taken and the procedure may return to action 400 for checking a next intrusion entry in the first memory 208. On the other hand, if the signature in the sign-off message could not be verified in action 408, the intrusion manager 200 will perform the above-described action 404 and may then return to action 400 for checking the next intrusion entry. The above-described actions may be repeated as long as there are further intrusion entries in the first memory 208 to investigate.

Figure 5:
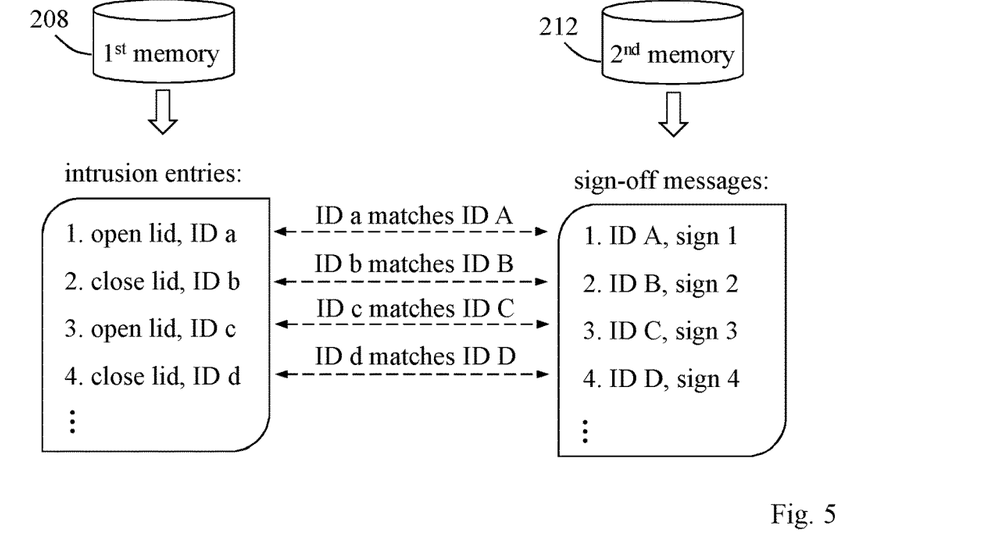
FIG. 5 is an example diagram illustrating how intrusion entries in a first memory can be checked against sign-off messages in a second memory, according to further example embodiments.

An example of how the above-described intrusion entries and matching sign-off messages may be stored in the first and second memories 208 and 212, respectively, will now be described with reference to FIG. 5. A first intrusion entry in memory 208 includes an intrusion type, indicating the lid has been opened, and an identification of the intrusion, "ID a". Each intrusion entry may also comprise a timestamp, not shown. A next intrusion entry in memory 208 includes another intrusion type, indicating the lid has been closed, and an identification of the second intrusion, "ID b". If timestamps are also included in the entries, it can be determined how long the equipment has been open between the first (open) and second (closed) entries.

As described above, an authorised intrusion must have an associated sign-off message with valid signature in the second memory 212 that matches the corresponding intrusion entry in memory 208. In FIG. 5, all shown intrusion entries in memory 208 have matching sign-off messages in memory 212. Accordingly, the first intrusion entry with ID a matches a first sign-off message with an identity "ID A" in memory 212 since ID a matches ID A, e.g. by being identical or otherwise related in a predefined manner. In a simple but illustrative example, such a relation may be ID A=2×ID a where ID a could be an integer such as a sequence number. In that case, all identities in the sign-off messages are twice the identities in the corresponding intrusion entries.

Each sign-off message in memory 212 also include a valid signature where both the first and the second sign-off messages contain the signatures "sign 1" and "sign 2", respectively, while the same person may have opened and then closed the lid according to the first and second intrusion entries. In that case, sign 1 and sign 2 may be the same signature or two related signatures. Similarly, the third and the fourth sign-off messages contain the signatures "sign 3"

and "sign 4", respectively, and another person may have opened and closed the lid according to the third and fourth intrusion entries.

An example of a procedure that can be used for checking detected intrusions by querying an authentication center, will now be briefly described with reference to the signaling diagram in FIG. 6, again using the same numerals as in FIG. 2. For example, the authentication center 214 described herein may be implemented as a function in a cloud-like environment having a huge amount of processing and storing resources, commonly referred to as "the cloud".

Figure 6:
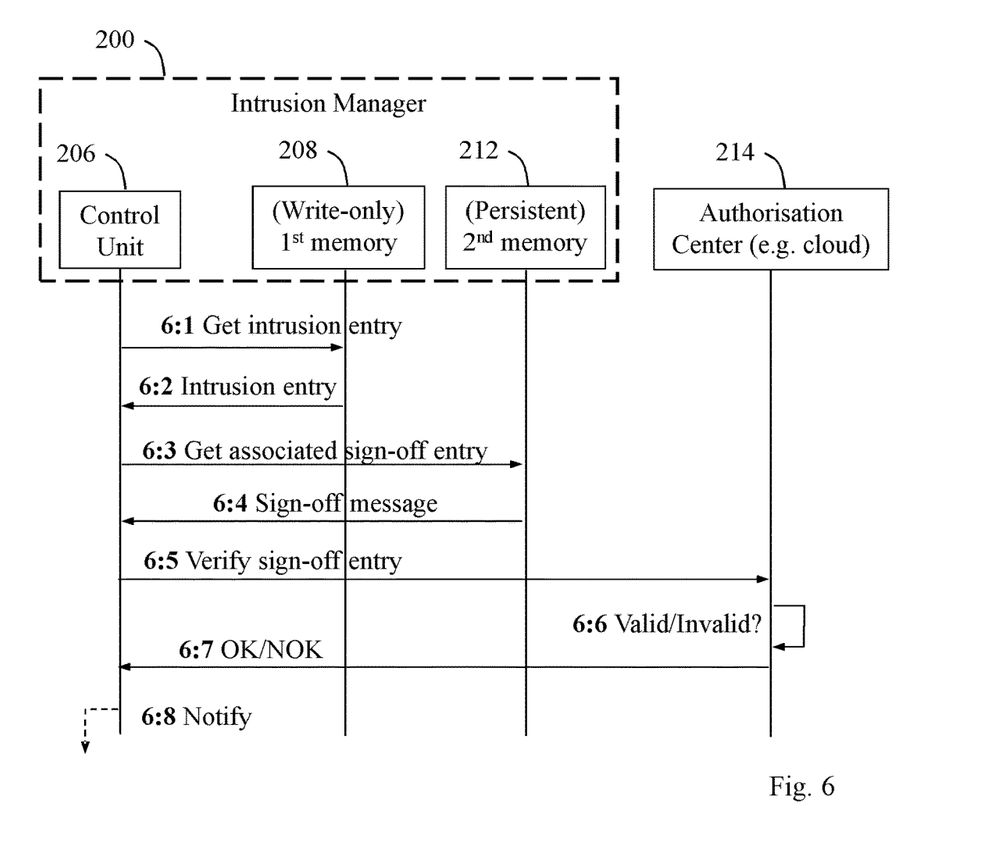
FIG. 6 is a signaling diagram illustrating a procedure when the solution is used for checking detected intrusions, according to further example embodiments.

Operation 6:1:

The control unit 206 requests for an intrusion entry from the first memory 208.

Operation 6:2:

The control unit 206 obtains the intrusion entry from the first memory 208.

Operation 6:3:

The control unit 206 searches for an associated sign-off message in the second memory 212, e.g. by comparing a timestamp and/or an identification comprised in the intrusion entry with a timestamp and/or an identification comprised in the sign-off messages in the second memory 212.

Operation 6:4:

The control unit 206 finds a matching sign-off message in the second memory 212, the message containing a signature.

Operation 6:5:

The control unit 206 queries the authentication center 214 as to whether the signature is valid or not.

Operation 6:6: The control unit 206 asks the authentication center 214 to verify the signature, i.e. to confirm whether it is valid or not.

The authentication center 214 checks validity of the signature against a local storage holding valid signatures.

Operation 6:7:

The authentication center 214 returns a confirmation (OK) or a denial (NOK) of the signature's validity to the control unit 206. If OK, the authentication center 214 may include information in the confirmation about which person(s) is/are authorised to use the signature.

Operation 6:8:

The control unit 206 may send a notification to a supervision center or the like, not shown, to indicate unauthorised intrusion, as in the above operation 2:7.

Figure 7:
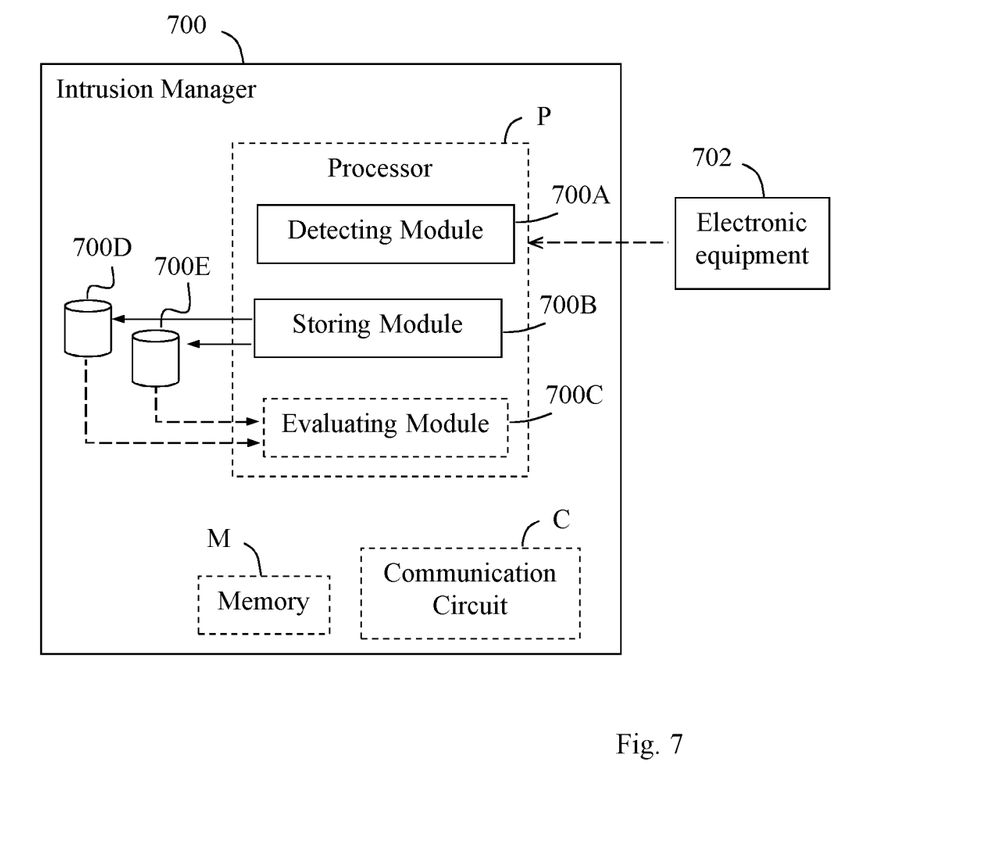
FIG. 7 is a block diagram illustrating how an intrusion manager may be structured, according to further example embodiments.

The block diagram in FIG. 7 illustrates a detailed but non-limiting example of how an intrusion manager 700 may be structured to bring about the above-described solution and embodiments thereof. The intrusion manager 700 may be configured to operate according to any of the examples and embodiments for employing the solution as described herein, where appropriate and as follows. The intrusion manager 700 is shown to comprise a processor P and a memory M, said memory comprising instructions executable by said processor whereby the intrusion manager 700 is operable as described herein. The intrusion manager 700 also comprises a communication circuit C with suitable equipment for receiving and sending information in the manner described herein.

Figure 2:
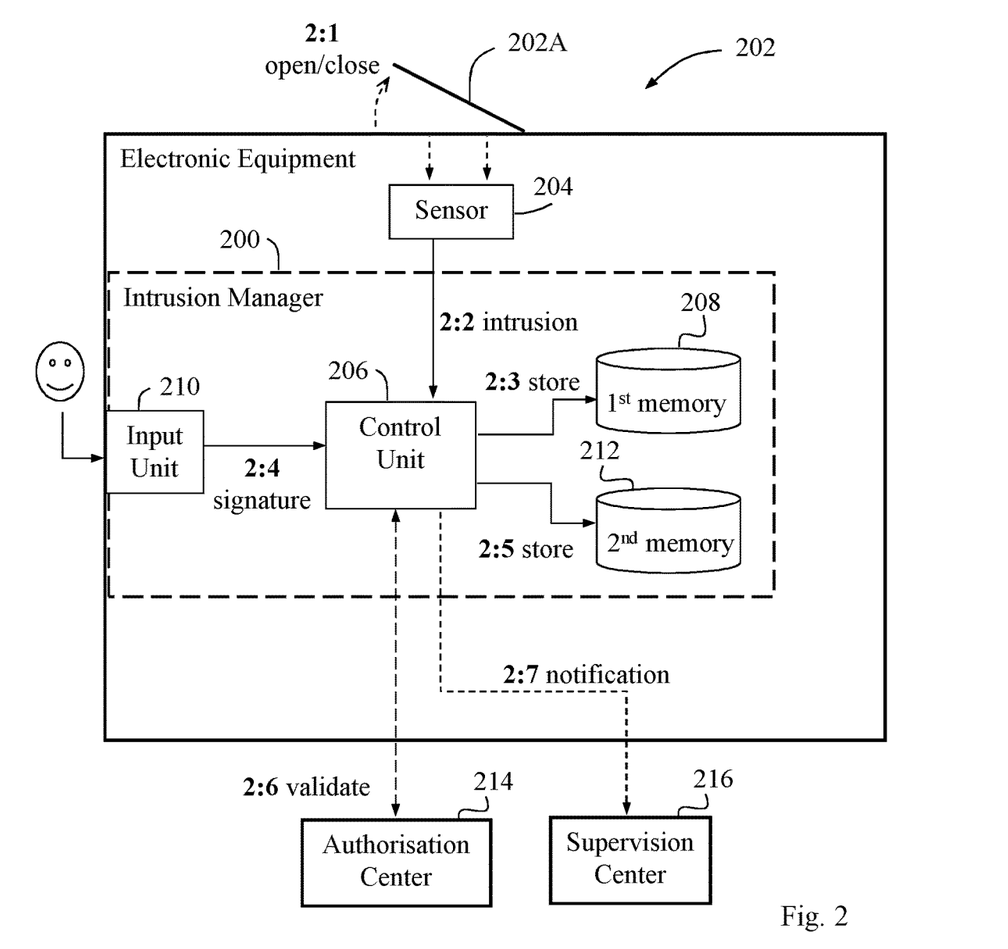
FIG. 2 is a communication scenario illustrating how the solution may be employed, according to some example embodiments.

The intrusion manager 700 corresponds to the intrusion manager 200 in FIG. 2. The communication circuit C may be configured for communication with a sensor in an electronic equipment 702, corresponding to the sensor 204 in FIG. 2, and with an authorisation center, such as the authorisation center 214 in FIG. 2, and with a supervision center, such as the supervision center 216 in FIG. 2, using suitable protocols and messages. The solution and embodiments herein are not limited to using any specific types of messages or protocols for the above communication.

The intrusion manager 700 comprises means configured or arranged to basically perform at least some of the actions in FIGS. 3 and 4, and more or less as described above for the intrusion manager 200 in various examples and embodiments. In FIG. 7, the intrusion manager 700 is arranged or configured to handle intrusion to an electronic equipment 702, as follows.

The intrusion manager 700 is configured to detect an intrusion to the electronic equipment. This detecting operation may be performed by a detecting module 700A in the intrusion manager 700, e.g. in the manner described above for action 300. The detecting module 700A could alternatively be named a sensing module or noticing module.

The intrusion manager 700 is further configured to store an intrusion entry indicating the detected intrusion, e.g. in a memory 700D where a written entry cannot be modified or erased. This storing operation may be performed by a storing module 700B in the intrusion manager 700, e.g. as described above for action 302. The storing module 700B could alternatively be named a registering module or writing module. The intrusion manager 700 may also be configured to receive a digital signature after detecting the intrusion. This operation may be performed by the communication circuit C, basically as described above for action 304.

The intrusion manager 700 is also configured to store an associated sign-off message which identifies the stored intrusion entry, e.g. in a persistent memory 700E, as described above for action 306, which may be performed by the storing module 700B. The stored sign-off message comprises a signature that validates the detected intrusion.

The intrusion manager 700 may further be configured to determine validity of any detected intrusion by checking whether an entry for the intrusion has an identification and/or timestamp that matches an identification and/or timestamp of a sign-off message which comprises a valid signature, e.g., as described above for actions 400-408. These actions may be performed by an evaluating module 700C in the intrusion manager 700 by checking entries and messages stored in the memories 700D and 700E.

It should be noted that FIG. 7 illustrates various functional modules or units in the intrusion manager 700, and the skilled person is able to implement these functional modules in practice using suitable software and hardware. Thus, the solution is generally not limited to the shown structures of the intrusion manager 700, and the functional modules or units 700A-C therein may be configured to operate according to any of the features and embodiments described in this disclosure, where appropriate.

The functional modules or units 700A-C described above could thus be implemented in the intrusion manager 700 by means of hardware and program modules of a computer program comprising code means which, when run by the processor P causes the intrusion manager 700 to perform at least some of the above-described actions and procedures.

In FIG. 7, the processor P may comprise a single Central Processing Unit (CPU), or could comprise two or more processing units such as CPUs. For example, the processor P may include a general purpose microprocessor, an instruction set processor and/or related chip sets and/or a special purpose microprocessor such as an Application Specific Integrated Circuit (ASIC). The processor P may also comprise a storage for caching purposes.

Each computer program may be carried by a computer program product in the intrusion manager 700 in the form of a memory M having a computer readable medium and being connected to the processor P. The computer program product or memory in the intrusion manager 700 may thus comprise a computer readable medium on which the computer program is stored e.g. in the form of computer program modules or the like. For example, the memory M may be a flash memory, a Random-Access Memory (RAM), a Read-Only Memory (ROM), an Electrically Erasable Programmable ROM (EEPROM) or Hard Drive storage (HDD), and the program modules could in alternative embodiments be distributed on different computer program products in the form of memories within the intrusion manager 700.

The solution described herein may thus be implemented in the intrusion manager 700 by a computer program comprising instructions which, when executed on at least one processor, cause the at least one processor to carry out the actions according to any of the above embodiments and examples, where appropriate. The solution may also be implemented in a carrier containing the above computer program, wherein the carrier is one of an electronic signal, an optical signal, a radio signal, or a computer readable storage product or computer program product.

While the solution has been described with reference to specific exemplifying embodiments, the description is generally only intended to illustrate the inventive concept and should not be taken as limiting the scope of the solution. For example, the terms "intrusion manager", "control unit", "electronic equipment", "one-time programmable memory", "persistent memory", "intrusion entry" and "sign-off message" have been used throughout this disclosure, although any other corresponding entities, functions, and/or parameters could also be used having the features and characteristics described here. The solution is defined by the appended claims.

The invention claimed is:

1. A method for handling intrusion to an electronic equipment, the method comprising:
    detecting an intrusion to the electronic equipment;
    storing, in a first memory, an intrusion entry indicating the detected intrusion, wherein the intrusion entry is associated with a first identifier;
    storing, in a second memory, an associated sign-off message which identifies the stored intrusion entry, the sign-off message comprising a signature that validates the detected intrusion, wherein the associated sign-off message is associated with a second identifier;
    determining that the first identifier is related to the second identifier; and
    determining that the intrusion entry is associated with the associated sign-off message in response to determining that the first identifier is related to the second identifier.

2. A method according to claim 1, wherein the signature is a digital signature received as input from an authorised person.

3. A method according to claim 1, wherein the signature is based on a digital signature that has been verified by a trusted party.

4. A method according to claim 1, wherein the intrusion is detected when a lid or cover on the electronic equipment is opened or closed.

5. A method according to claim 1, wherein any stored intrusion entry having no matching sign-off message with a valid signature is determined to be unauthorised.

6. A method according to claim 5, wherein a notification is sent to a supervision center to indicate the unauthorised intrusion.

7. A method according to claim 1, wherein one or more intrusion entries are stored in the first memory where a written entry cannot be modified or erased and one or more associated sign-off messages are stored in the second memory.

8. A method according to claim 7, wherein the first memory and the second memory are located in the electronic equipment.

9. A method according to claim 1, wherein the intrusion entry and the sign-off message comprise an identification and/or timestamp to enable validation of the detected intrusion by matching of said intrusion entry with the associated sign-off message.

10. A method according to claim 1, wherein validity of any detected intrusion is determined by checking whether an entry for the intrusion has an identification and/or timestamp that matches an identification and/or timestamp of a sign-off message which comprises a valid signature.

11. A method according to claim 1, wherein an intrusion is detected by at least one of: A) a microswitch, B) a magnetic field sensor, C) a light sensor, and D) a motion sensor.

12. A method according to claim 1, wherein a history of stored intrusion entries is used for troubleshooting or evaluation of the electronic equipment.

13. A computer program comprising instructions which, when executed on at least one processor, cause the at least one processor to carry out the method according to claim 1.

14. An intrusion manager arranged to handle intrusion to an electronic equipment, wherein the intrusion manager comprises a processor that is configured to:
    detect an intrusion to the electronic equipment;
    store, in a first memory, an intrusion entry indicating the detected intrusion, wherein the intrusion entry is associated with a first identifier;
    store, in a second memory, an associated sign-off message which identifies the stored intrusion entry, the sign-off message comprising a signature that validates the detected intrusion, wherein the associated sign-off message is associated with a second identifier;
    determine that the first identifier is related to the second identifier; and
    determine that the intrusion entry is associated with the associated sign-off message in response to determining that the first identifier is related to the second identifier.

15. An intrusion manager according to claim 14, wherein the signature is a digital signature and the intrusion manager is configured to receive the digital signature as input from an authorised person.

16. An intrusion manager according to claim 14, wherein the signature is based on a digital signature that has been verified by a trusted party.

17. An intrusion manager according to claim 14, wherein the processor is further configured to detect the intrusion when a lid or cover on the electronic equipment is opened or closed.

18. An intrusion manager according to claim 14, wherein the processor is further configured to determine any stored intrusion entry having no matching sign-off message with a valid signature, to be unauthorised.

19. An intrusion manager according to claim 18, wherein the processor is further configured to send a notification to a supervision center to indicate the unauthorised intrusion.

20. An intrusion manager according to claim 14, wherein the processor is further configured to store one or more intrusion entries in the first memory where a written entry cannot be modified or erased, and to store one or more associated sign-off messages in the second memory.

21. An intrusion manager according to claim 20, wherein the first memory and the second memory are comprised in the intrusion manager and arranged to be located in the electronic equipment.

22. An intrusion manager according to claim 14, wherein the intrusion entry and the sign-off message comprise an identification and/or timestamp to enable validation of the detected intrusion by matching of said intrusion entry with the associated sign-off message.

23. An intrusion manager according to claim 14, wherein the processor is further configured to determine validity of any detected intrusion by checking whether an entry for the intrusion has an identification and/or timestamp that matches an identification and/or timestamp of a sign-off message which comprises a valid signature.

24. An intrusion manager according to claim 14, wherein the processor is further configured to detect an intrusion by at least one of: A) a microswitch, B) a magnetic field sensor, C) a light sensor, and D) a motion sensor.

25. An intrusion manager according to claim 14, wherein the processor is further configured is configured to use a history of stored intrusion entries for troubleshooting or evaluation of the electronic equipment.

\* \* \* \* \*